Aug. 9, 1932.  E. W. SEEGER  1,871,392
CONTROLLER FOR INDUCTION MOTORS
Filed Sept. 13, 1929
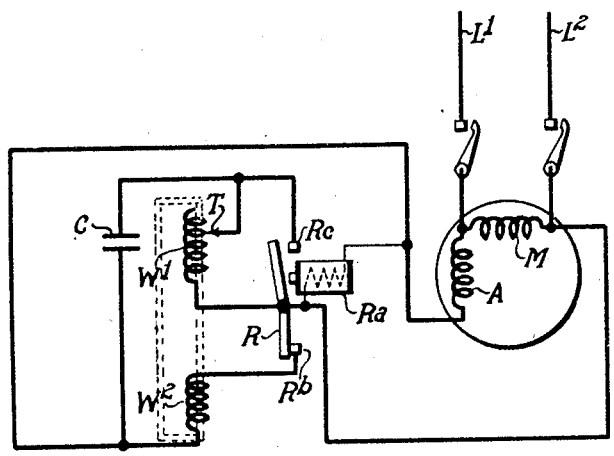
INVENTOR.
Edwin W. Seeger
BY
ATTORNEY Patented Aug. 2, 1932

1,871,392

UNITED STATES PATENT OFFICE

EDWIN W. SEEGER, OF WAUWATOSA, WISCONSIN, ASSIGNOR TO CUTLER-HAMMER, INC., OF MILWAUKEE, WISCONSIN, A CORPORATION OF DELAWARE

CONTROLLER FOR INDUCTION MOTORS

Application filed September 13, 1929. Serial No. 892,393.

This invention relates to controllers for split phase induction motors. Such single phase motors have two windings connected in parallel, one winding being connected directly across the line, while a condenser is connected in series with a second winding to cause the current in the second winding to lead the current in the first winding. In order to produce the most favorable starting and running conditions the capacitance of the circuit of the second winding should have a relatively high value during the starting period and a lower value after the motor has reached normal running speed.

Controllers for starting and reversal of such single phase motors have been proposed, wherein two condensers are commutated to provide for different starting and running capacitance, or wherein the same result is obtained with a single condenser of minimum capacity.

An object of the invention is to provide automatic means for controlling the condenser capacitance during starting and normal running of the motor.

Another object of the invention is to provide means for commutating the single condenser in response to a voltage induced in the winding of the motor.

Another object is to provide for commutating the condenser to produce optimum capacitance in the starting winding during starting and running of the motor.

A further object is a controller of simpler construction than the controllers which have been proposed for like purposes heretofore.

Another object is a controller which requires only a single condenser for both starting and running connections wherein the effect of such condenser is amplified during the starting period.

Further objects and advantages will be apparent from the appended specification and drawing.

To attain these objects I connect the condenser during the starting period across the primary or high voltage taps of an auto transformer, while the transformer low voltage taps are connected in series with the motor starting winding. Thus the effective value of the capacitance of the condenser in series with the motor winding is increased, without a corresponding increase of the size and capacity of the condenser. During the running period, however, the condenser is directly connected in series with the starting winding so that its effective value relative to such winding is reduced in accordance with the operating requirements of the motor.

I also provide the auto transformer winding with two separate sections which by means of a single pole double throw switch are connected in series during the starting period, while they are disconnected from the circuit during the running period.

The single diagrammatic figure shows one embodiment of my invention.

Referring to the figure the motor has a main winding M and an auxiliary winding A. The main winding M is directly connected across the lines $L^1$ and $L^2$, while the connections of the auxiliary winding A will be more fully described. The controller also includes the condenser C and a relay R having a magnet winding $Ra$, a normally closed contact $Rb$ and normally open contact $Rc$, and an auto transformer the winding of which is divided into the sections $W^1$ and $W^2$. The winding $W^1$ may have an adjustable tap T by means of which the number of turns included in the circuit of said winding may be varied.

The fixed end of the winding $W^1$ is connected to the line $L^2$, while the adjustable tap is connected to the contact $Rc$ of the relay R. One end of the winding $W^2$ is connected to the contact $Rb$ of relay R, while the other end of said winding is connected to one end of the motor winding A, whose other end is connected to the line $L^1$. One side of the condenser C is connected to the variable tap of the winding $W^1$ while the other end is connected to that end of the winding $W^2$ which in turn is connected to one end of the winding A. The pivot of the relay R is also connected to the line $L^2$.

The controller operates as follows:

When the switch from the lines $L^1$ and $L^2$ is closed, a current flows from line $L^1$ through winding M to line $L^2$. A second current flows from line L¹ through the winding A through winding W² over normally closed contact Rb over the pivot point of the relay R to line L². The current flowing in the winding W² induces a voltage in the winding W¹ and as the two windings are connected in series, a voltage is impressed upon the condenser C which is the sum of the voltages induced in the two windings W¹ and W². Hence a leading current circulates through the windings W¹ and W² and the condenser, and this leading current causes the current which flows through the winding A and through the winding W² to lead the current flowing in the winding M. As the voltage impressed upon the condenser is higher than the voltage which would be impressed upon it, if the auto transformer were not employed, it will be obvious that the capacitance effect in the circuit of the winding A¹ is greater than would be obtained if the condenser alone were employed.

It is also obvious that at the moment of starting the voltage impressed upon the winding W¹ and hence the voltage impressed upon the coil Ra is approximately equal to the full line voltage, and the relay is so adjusted that it does not attract its armature at that voltage. The current flowing in the winding A by virtue of the condenser C and the transformer windings W¹ and W² is approximately 90° out of phase with respect to the current in the winding M. As the motor accelerates a counter-electromotive-force is induced in the winding A which increases the voltage across the winding W¹ and when upon the attainment of a certain speed, it has risen to the value for which the relay R is adjusted to operate, the latter attracts its armature and thereby opens contact Rb and closes contact Rc. This short circuits the winding W¹ and opens the circuit for the winding W². The condenser C is thus connected directly in series with the winding A thereby reducing the capacitance of the circuit, the relay winding remaining sufficiently energized to keep the circuit closed.

What I claim as new and desire to secure by Letters Patent is:

1. In a controller, in combination, an induction motor having two primary windings, a transformer, a condenser, a single-pole double-throw switch and circuits which when said switch is in one position connect the condenser across the high voltage winding of the transformer and the low voltage winding of the latter to one of the motor windings for starting and which when said switch is in another position connect the condenser directly in series with said last mentioned winding and remove the transformer from circuit for running.

2. In a controller, in combination, an induction motor having two primary windings, a transformer, a condenser, a single-pole double-throw magnet switch responsive to a voltage induced in a winding of said motor, and connections commutatable by said switch for selectively connecting the condenser across the high voltage winding of the transformer and the low voltage winding of the latter to one of the primary windings during starting and to connect the condenser directly in series with said primary winding and to remove the transformer from circuit during running.

3. In a controller, in combination, an induction motor having two primary windings, a transformer provided with two windings, a condenser, a single-pole double-throw magnet switch and circuits commutatable by said switch to connect said transformer windings in series with one another and one in series with one of the motor windings and to connect said condenser across both transformer windings when said switch is in one position and to connect the condenser directly in series with said last mentioned motor winding and to interrupt the series connection of said transformer winding to thereby deenergize the latter for running when said switch is in another position.

4. In a controller, in combination, an induction motor having two primary windings, a transformer having two windings, a condenser, a single-pole double-throw magnet switch responsive to a voltage induced in one of said primary windings, circuits established by said switch when in one position to connect said transformer windings in series with one another and one in series with one of the motor windings and to connect said condenser across both transformer windings for starting and circuits established by said switch when in another position to connect said condenser directly in series with said last mentioned motor winding and to remove said transformer windings from circuit for running.

In witness whereof I have hereunto subscribed my name.

EDWIN W. SEEGER.